United States Patent
Omiya et al.

(10) Patent No.: US 7,019,914 B2
(45) Date of Patent: Mar. 28, 2006

(54) LENS BARREL AND IMAGE TAKING APPARATUS

(75) Inventors: Akio Omiya, Saitama (JP); Takehiko Senba, Asaka (JP); Hiroshi Endo, Asaka (JP)

(73) Assignees: Fujinon Corporation, Saitama (JP); Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/967,329

(22) Filed: Oct. 19, 2004

(65) Prior Publication Data

US 2005/0185289 A1     Aug. 25, 2005

(30) Foreign Application Priority Data

| Feb. 23, 2004 | (JP) | ............................. 2004-046617 |
| Feb. 23, 2004 | (JP) | ............................. 2004-046628 |
| Feb. 23, 2004 | (JP) | ............................. 2004-046630 |
| Feb. 23, 2004 | (JP) | ............................. 2004-046638 |
| Sep. 24, 2004 | (JP) | ............................. 2004-276740 |

(51) Int. Cl.
G02B 15/14     (2006.01)

(52) U.S. Cl. ........................ 359/695; 359/701; 359/704

(58) Field of Classification Search ................ 359/695, 359/699–701, 823
See application file for complete search history.

(56) References Cited

U.S. PATENT DOCUMENTS

| 5,011,273 | A | * | 4/1991 | Ueyama et al. ............. 359/701 |
| 5,978,156 | A | * | 11/1999 | Okada et al. ................ 359/699 |
| 5,991,097 | A | * | 11/1999 | Nomura et al. ............. 359/700 |
| 6,035,134 | A | * | 3/2000 | Sato et al. ..................... 396/55 |
| 6,483,994 | B1 | * | 11/2002 | Kabe et al. .................... 396/79 |
| 6,546,202 | B1 | * | 4/2003 | Onozuka et al. ............ 396/135 |
| 6,567,221 | B1 | * | 5/2003 | Todani ........................ 359/699 |
| 6,757,489 | B1 | * | 6/2004 | Nomura et al. ............... 396/72 |
| 2005/0185297 | A1 | * | 8/2005 | Omiya et al. ............... 359/704 |
| 2005/0185950 | A1 | * | 8/2005 | Omiya et al. ............... 396/349 |

FOREIGN PATENT DOCUMENTS

| JP | 6-67076 A | 3/1994 |
| JP | 2003-295031 A | 10/2003 |

OTHER PUBLICATIONS

Discover Originality High Technology Grand Prix 17$^{th}$ Excellent Research Paper, Special Prize for the 70$^{th}$ Anniversary of the birth of Nihon Kogyo Shimbun, "Technique Used in Super-slim Digital Camera OptioS", Mr. Hiroshi Nomura et al.

* cited by examiner

*Primary Examiner*—Ricky Mack
(74) *Attorney, Agent, or Firm*—Sughrue Mion, PLLC

(57) ABSTRACT

A lens barrel has its length which is reduced by dispensing with guide rods or a travel mechanism long extending from a base which fixes an image pickup device. The optical axes of multiple lens groups can be easily aligned. An image taking apparatus has its body which has the lens barrel incorporated into it. A second lens group, third lens group and, via the travel mechanism, a fourth lens group are supported by a straight-ahead key ring, and the straight-ahead key ring also supports a front tube holding the first lens group. A zoom motor and a focus motor are also supported by the straight-ahead key ring.

14 Claims, 13 Drawing Sheets

LENS BARREL AND IMAGE TAKING APPARATUS

BACKGROUND OF THE INVENTION

1. Field of the Invention

The present invention relates to a lens barrel which holds a zoom lens consisting of multiple lens groups as well as to an image taking apparatus which is provided with the lens barrel and takes images by capturing light from a subject entering through the zoom lens held by the lens barrel.

2. Description of the Related Art

Today, digital cameras are in rapidly expanding use, and they are required to provide ever higher image quality along with reductions in overall size and profile thickness. As a digital camera to meet these requirements, there is proposed a thin visiting card-size digital camera equipped with a lens barrel holding a zoom lens consisting of multiple lens groups (see non-patent literature 1, Internet URL http://www.business-ijp/sentan/jusyou/2003/pentax/) and is already commercially available. This digital camera permits zooming with high image quality with an optical zoom while earlier thin digital cameras use an electronic zooming function to achieve a high degree of magnification.

One of the notable needs of users is equipment with such an optical zoom capable of zooming at an even higher magnification while realizing further reductions in size and profile thickness.

Patent Document 1 (Japanese Patent Laid-Open No. 2003-295031) proposes a technique for collapsing a lens barrel equipped with a zoom lens into a thin camera body by contriving an improved way of forming cam grooves.

The internal configuration of the lens barrel disclosed in this patent literature 1 is described below.

FIGS. 1, 2 and 3 are sections taken along the optical axis of a lens barrel built into a digital camera. Of these FIGS. 1 through 3, FIGS. 1 and 2 show the lens barrel in its extended state. Incidentally, patent literature 1 states that FIG. 1 shows a telephoto end and FIG. 2, a wide-angle end. FIG. 3 shows the lens barrel in its collapsed state. Further, FIG. 4 is a developed view illustrating cam grooves which function when the lens barrel is extended out or collapses into the camera body.

The configuration of this lens barrel 100 is described below with reference to FIG. 1 through FIG. 4.

This lens barrel 100 holds a zoom lens of a four-group configuration consisting of a first lens group 210, a second lens group 220, a third lens group 230 and a fourth lens group 240. By moving the second lens group 220, out of these four lens groups, in the direction of the optical axis, the focal distance is adjusted, and moving the fourth lens group 240, serving as the focus lens, in the direction of the optical axis, focusing is accomplished.

The first lens group 210 is held in an inner tube 110. This inner tube 110 is provided with cam pins 111, and these cam pins 111 engaged with cam grooves 121 formed in the inner surface of an outer tube 120 (see FIG. 4). Three such cam pins 111 are disposed at unequal intervals on the outer wall of the inner tube 110, and three cam grooves 121 to engage with those cam pins 111 are formed at unequal intervals in the inner wall of the outer tube 120 (see FIG. 4). Therefore, when the rotation of a zoom motor 270 is transmitted from a coupling gear 271 (see FIG. 2) to a gear 124 disposed on the inner wall of the outer tube 120 to turn the outer tube 120, the first lens group 210 extends together with the inner tube 110 along the shape of the cam grooves 121.

The second lens group 220 is held by a lens group holding frame 221, and three cam pins 222 are disposed at unequal intervals on the circumference of that lens group holding frame 221. Those cam pins 222 engage with respective cam grooves 122 formed in the inner wall of the outer tube 120 (see FIG. 4). A guide rod 1132 is passed through a through-hole 221a formed in the lens group holding frame 221 of the second lens group 220. When the outer tube 120 turns, the second lens group 220, guided by that guide rod 1132, moves in the direction of the optical axis. The guide rod 1132 is held by a tip support 1132a, and a guide rod 1133 to guide the movement of the third lens group 230 is supported by another tip support 1133a. These tip supports 1132a and 1133a, besides respectively supporting the two guide rods 1132 and 1133, are also used as members to support the inner tube 110. These tip supports 1132a and 1133a are equipped with an intermediate frame 1101 and a retainer ring 1102. The intermediate frame 1101 is inserted slidably along the inner wall of the inner tube 110, while the retainer ring 1102 is provided at the rear end of that inner tube 110 to prevent the intermediate frame 1101 from moving backward. The intermediate frame 1101 and the retainer ring 1102 are respectively equipped with spring pegs 1101a and 1102b. When the intermediate frame 1101 is extended together with the inner tube 110, a spring 1103 bridging those spring pegs urges the intermediate frame 1101 forward along the sliding surface to restrict the movement of the intermediate frame 1101 not to let the intermediate frame 1101 move backward.

Further, one cam groove 123 (see FIG. 4) to engage with cam pins (not shown) disposed on a lens group holding frame 130 of the third lens group 230 is formed in the outer tube 120 between the cam grooves 121 and 122. Therefore, when the outer tube 120 turns, receiving the driving force of the zoom motor 270 via the coupling gear 271 and the gear 124 (see FIG. 2), the third lens group 230 also moves in the direction of the optical axis along the shape of the cam groove 123. A shutter unit 131 is linked to the lens group holding frame 130 holding this third lens group 230.

A through-hole 131a is formed in this lens group holding frame 130, too, as in the lens group holding frame 221, and the guide rod 1132 is passed through this through-hole 131a. Further, the guide rod 1132 is also passed through a through-hole 141a formed in a lens group holding frame 140, to be described after wards, for holding the fourth lens group 240. In this way, the example taken up here has a configuration in which the second lens group 220, the third lens group 230 and the fourth lens group 240 are guided in movement by the common guide rod 1132 to prevent the optical axis from misalignment.

The extending operation of the lens barrel 100 having such a structure is described in detail with reference to FIG. 4.

When the outer tube 120 rotates driven by the zoom motor 270, the inner tube 110 is extended from a collapsed state along the shape of the cam grooves 121 (the area marked with symbol A) to its extended position (the end toward symbol B of the area marked with symbol A), and held in that extended position (the area marked with symbol B). Until the outer tube 120 is held in this extended position, the second lens group 220 moves in the area marked with symbol C along the shape of the cam grooves 122, and reaches the end of the area marked with symbol C when the inner tube 110 has been extended to its extended position. When a zoom switch (not shown) is operated then, the second lens group 220 enters into the area marked with symbol D according to the operation of that zoom switch. If the zoom switch continues to be operated, it will reach the end of the symbol D area. On the other hand, when the outer tube 120 is turned, the third lens group 230 moves from its collapsed position in the extending area (the area marked with symbol E) along the cam groove 123 to reach its extended position (the intersection between symbol E and symbol F) and, even if the zoom switch is operated, remains held in that extended position (the area marked with symbol F).

By arranging the cam grooves effectively in the inner wall of the outer tube 120 in this way, it is made possible to move the first lens group 210, the second lens group 220 and the third lens group 230 out of the four lens groups in the direction of the optical axis along the shapes of the cam grooves by the rotation of the single tube 120, and to perform zooming by moving the second lens group in the direction of the optical axis according to the operation of the zoom switch.

In the lens barrel 100 shown in FIGS. 1 through 3, the aftermost fourth lens group 240 out of the four lens groups constituting the zoom lens is used as the focus lens. Since this zoom lens held by the lens barrel 100 has a high zoom ratio, the traveling distance of the fourth lens group 240 to function as its focus lens should be relatively long. Therefore in this example, a column screw 1131 (see FIG. 1) having a length equal to that long traveling distance is disposed along the optical axis, a nut 141b is fixed to the lens group holding frame 140 holding the fourth lens group 240, and the column screw 1131 is screwed into that nut 141b to enable focusing to be accurately accomplished.

The rotational driving force of a focus motor (not shown) is transmitted to this column screw 1131 via a gear train (not shown) to rotate this column screw 1131 and, along with that rotation, a lens group holding frame 141 guided by the column screw 1131 and the guide rods 1132 and 1133 moves in the direction of the optical axis correspondingly to the rotation of the column screw 1131 to perform focusing. When an image taking lens begins catching a subject, image data are generated by an image pickup device 280, the focus position is detected on the basis of the image data, and focusing is performed by turning the column screw to move the fourth lens group 240, which serves as the focus lens, to that detected focus position.

If a shutter button (not shown) is pressed after focusing is accomplished, the shutter unit 131 arranged on the lens group holding frame 130 holding the third lens group 230 is driven in synchronism with full pressing of the shutter button to take an image. Light from the subject having passed the first lens group 210, the second lens group 220, the third lens group 230 and the fourth lens group (focus lens) 240 forms an image on the light-receiving surface of the image pickup device 280, and this image pickup device 280 generates an image signal which represents the image of the subject formed on that light-receiving surface.

By arranging the multiple cam grooves effectively in the inner wall of the outer tube in this way, bringing them into cam engagement with the inner tube, and causing the aftermost lens group of the zoom lens to function as the focus lens, the length of the lens barrel in the collapsed state is reduced to relative compactness to be accommodable in a relatively thin body, and a lens barrel which can achieve a high zoom ratio when extended is thereby realized.

However, the configuration described above in which the travel of the second lens group 220, the third lens group 230 and the fourth lens group 240 is guided by the common guide rod 1132 extending over a great length from the light-receiving surface of the image pickup device imposes a limit to the thinning of the profile.

Apart from that, patent literature 2 (Japanese Patent Laid-Open No. 6-67076) discloses a three-group zoom lens barrel which can provide a long traveling distance for lenses at a small angle of rotation of a cam ring.

According to this patent literature 2, though there is no guide rod or the like extending over a great length from a base which fixes an image pickup device, the second and third groups out of the three lens groups, prevented from rotating by a straight-ahead key, move in the direction of the optical axis via a cam mechanism, and supported only via that cam mechanism. Accordingly, it is extremely difficult to adjust the optical axis with high precision and, if this technique is applied to a zoom lens of a four lens-group configuration, adjustment of the optical axis and keeping its accuracy will be extremely difficult, making it prohibitively difficult to extend this technique as it is to a four lens-group configuration.

SUMMARY OF THE INVENTION

The present invention has been made in view of the above circumstances and provides a lens barrel in which the optical axes of lens groups can be readily aligned even if its length is shortened by dispensing with a guide rod long extending from a base which fixes an image pickup device, and an image taking apparatus into whose body the lens barrel is incorporated.

To achieve the objected stated above, the present invention provides a lens barrel which holds a zoom lens consisting of multiple lens groups, the lens barrel including:

a fixed tube, a straight-ahead key member which is engaged with the fixed tube to be able to advance or retract, a middle tube which is rotatably engaged with the straight-ahead key member and is caused by cam engagement with the fixed tube to advance or retract along with the rotation; and a front tube which is engaged with the straight-ahead key member to be able to advance or retract and is caused by cam engagement with the middle tube to advance or retract along with the rotation of the middle tube, wherein the zoom lens is configured of multiple lens groups consisting of a first lens group which is fixed to the front tube, a second lens group, a third lens group and a fourth lens group which are fixed to the straight-ahead key member or supported by the straight-ahead key member to be able to advance or retract.

In the lens barrel according to the invention, out of the constituent groups of the zoom lens, all of the second lens group, third lens group and fourth lens group are fixed to the straight-ahead key member or supported by the straight-ahead key member to be able to advance or retract, and the first lens group is fixed to the front tube engaged with the straight-ahead key member to be able to advance or retract. Where all of the second lens group, third lens group and fourth lens group are mounted on the straight-ahead key member, the optical axes can be aligned with high precision, there can be realized a lens barrel in which the optical axes of the multiple lens groups can be easily aligned even if a reduction in length is attempted by dispensing with guide rods or the travel mechanism long extending from the base which fixes the image pickup device.

It is preferable here for the second lens group to be supported by the straight-ahead key member to be able to advance or retract and caused by cam engagement with the middle tube to advance or retract along with the rotation of the middle tube.

It is preferable for the third lens group to be also fixed to the straight-ahead key member.

It is also preferable for the fourth lens group to be the focus lens and to be supported by the straight-ahead key member via a travel mechanism for focusing, for that travel mechanism to be equipped with a focus motor which provides a driving force to move the focus lens, and for the focus motor to be supported by the straight-ahead key member.

Then, when extending the lens barrel, the third lens group supported by the straight-ahead key member, together with the middle tube, moves in the direction of the optical axis to be arranged in its prescribed position, and the fourth lens group is also arranged in its own prescribed position along with travel of that straight-ahead key member in the direction of the optical axis. If this prescribed position is set in the vicinity of the in-focus position of this zoom lens, focusing can be accomplished by having the travel mechanism the position of the fourth lens group, which is in the vicinity of that in-focus position.

It is also preferable for a zoom motor to be provided to vary the zoom ratio of the zoom lens by rotationally driving the middle tube, and the zoom motor to be supported by the straight-ahead key member. It is further preferable for the middle tube to have in part of its inner wall a row of gear teeth disposed in the circumferential direction, and for the zoom motor rotationally to drive the middle tube via a gear which links the rotation shaft of the zoom motor and the row of gear teeth.

It is also preferable for the middle tube to have cam pins which protrude from its outer wall surface and are intended for cam engagement with the fixed tube, first cam grooves which rotatably engage with the straight-ahead key member and second cam grooves for cam engagement with the front tube, both formed in its inner wall, and it is also preferable for those first cam grooves to extend in the circumferential direction.

Then, by turning according to the operation of the zoom switch the middle tube by the use of the zoom motor supported by the straight-ahead key member, zooming can be accomplished by moving the second lens group in the direction of the optical axis.

The present invention also provides an image taking apparatus equipped with a lens barrel which holds a zoom lens consisting of multiple lens groups and takes an image by catching light incident from the subject via the zoom lens held by the lens barrel, wherein the lens barrel includes a fixed tube, a straight-ahead key member which is engaged with the fixed tube to be able to advance or retract, a middle tube which is rotatably engaged with the straight-ahead key member and is caused by cam engagement with the fixed tube to advance or retract along with the rotation, and a front tube which is engaged with the straight-ahead key member to be able to advance or retract and is caused by cam engagement with the middle tube to advance or retract along with the rotation of the middle tube;

the zoom lens being configured of multiple lens groups consisting of a first lens group which is fixed to the front tube, a second lens group, a third lens group and a fourth lens group which are fixed to the straight-ahead key member or supported by the straight-ahead key member to be able to advance or retract.

The image taking apparatus according to the invention is equipped with a lens barrel having a built-in zoom lens which has no distortion in optical axis and excels in optical characteristics. Therefore, high-definition image taking can be accomplished with this image taking apparatus.

It is preferable here for the lens barrel to be equipped with a focus motor which provides a driving force to a travel mechanism to move the focus lens, and the focus motor to be supported by the straight-ahead key member. It is further preferable here for the lens barrel to be further provided with a zoom motor which varies the zoom ratio of the zoom lens by rotationally driving the middle tube, and the zoom motor to be supported by the straight-ahead key member.

It is also preferable for the middle tube to have cam pins which protrude from its outer wall surface and are intended for cam engagement with the fixed tube, first cam grooves which rotatably engage with the straight-ahead key member and second cam grooves for cam engagement with the front tube, both formed in its inner wall.

Then, an image taking apparatus having a compact lens barrel whose middle tube serves as the driving tube can be realized.

It is also preferable for the image taking apparatus to be further provided with an image pickup device which generates an image signal by catching light incident from the subject via the zoom lens held by the lens barrel.

Where such an image pickup device is provided, a further enhancement in zoom ratio can be achieved by performing electronic zooming by using the image pickup device in addition to optical zooming.

As hitherto described, there are realized a lens barrel in which the optical axes of the multiple lens groups can be easily aligned even if a reduction in length is attempted by dispensing with guide rods or the travel mechanism long extending from the base which fixes the image pickup device, and an image taking apparatus whose body has the lens barrel incorporated into it.

DETAILED DESCRIPTION OF THE PREFERRED EMBODIMENTS

An embodiment of the present invention is described below.

Figure 5:
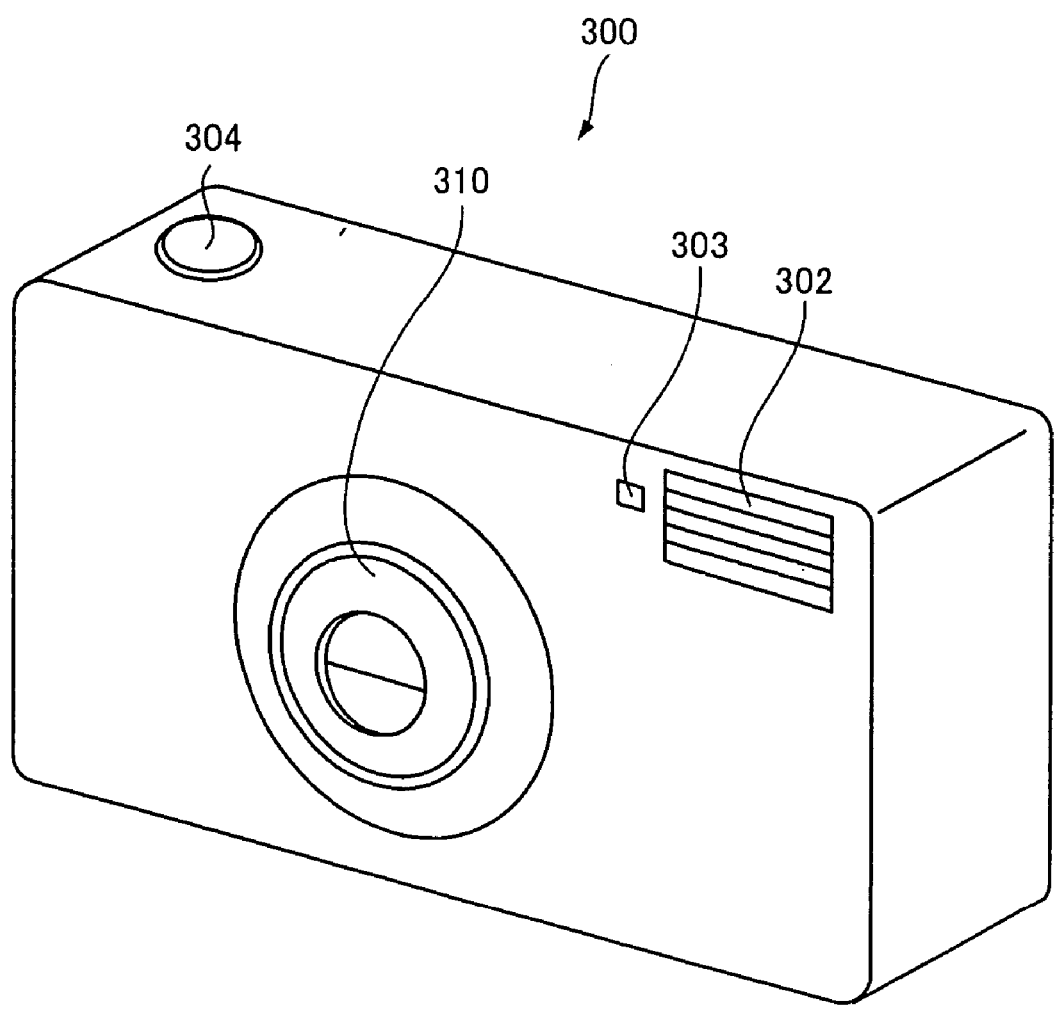
FIG. 5 is an external perspective view of a digital camera 300, which is an embodiment of an image taking apparatus according to the present invention and which incorporates an embodiment of a lens barrel according to the invention.
Figure 6:
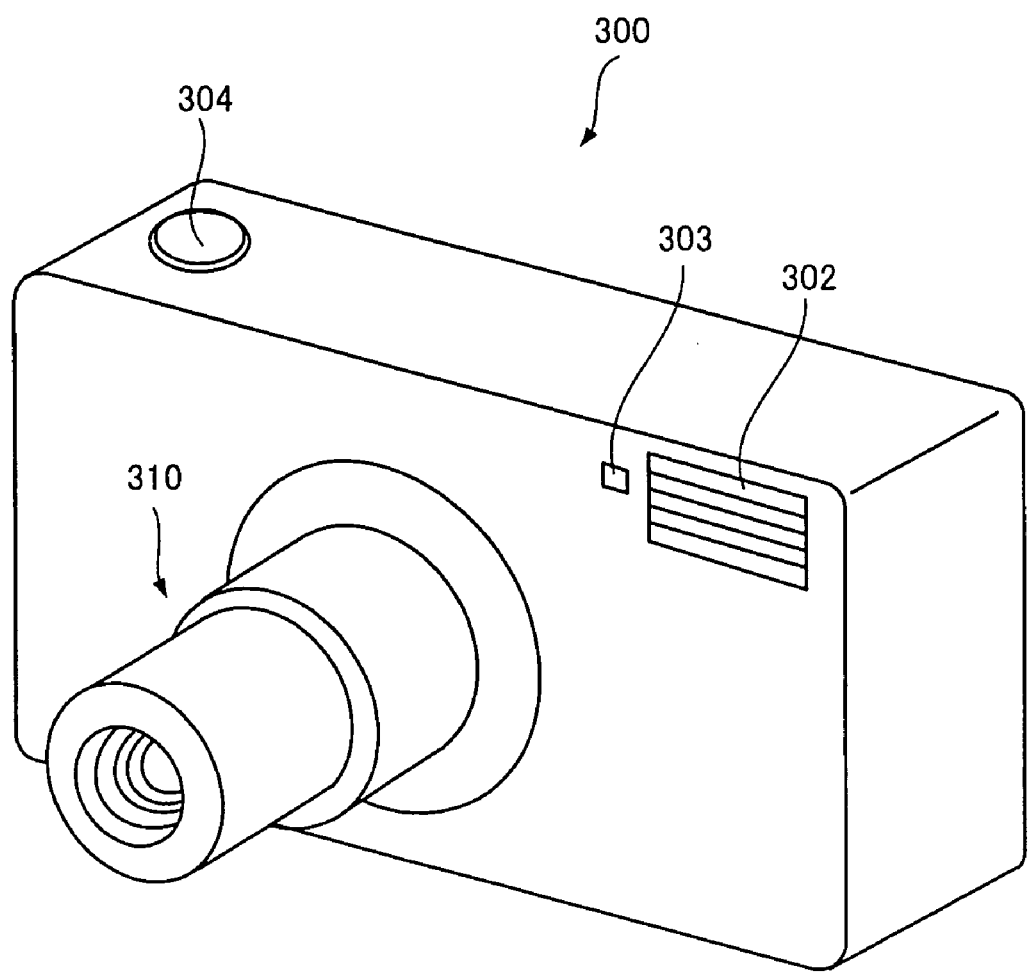
FIG. 6 shows a state in which the lens barrel of the digital camera shown in FIG. 5 is extended.

FIGS. 5 and 6 are external perspective views of a digital camera, which is an embodiment of an image taking apparatus according to the present invention and which incorporates an embodiment of a lens barrel according to the invention.

FIG. 5 is an external view of a lens barrel 310 incorporated into this digital camera 300 when it is in a collapsed state, and FIG. 6 is an external view of that lens barrel 310 when it is in an extended state.

The lens barrel 310 of the digital camera 300 shown in FIGS. 5 and 6 has an image taking lens consisting of four lens groups built into it which is to be described afterwards. By moving a second lens group out of those four lens groups in the direction of the optical axis, the focal distance is adjusted, and by moving a fourth lens group as the focus lens in the direction of the optical axis, focusing is performed.

In the upper front part of the digital camera 300 shown in FIGS. 5 and 6, a fill flash window 302 and a finder objective window 303 are arranged. Further, a shutter button 304 is arranged on the top face of this digital camera 300.

A zoom control switch is disposed on the back (not shown) of this digital camera 300. While one end of this zoom control switch is kept pressed, the lens barrel 310 extends to the telephoto side. While the other end of the zoom control switch is kept pressed, the lens barrel 310 moves to the wide-angle side.

Figure 7:
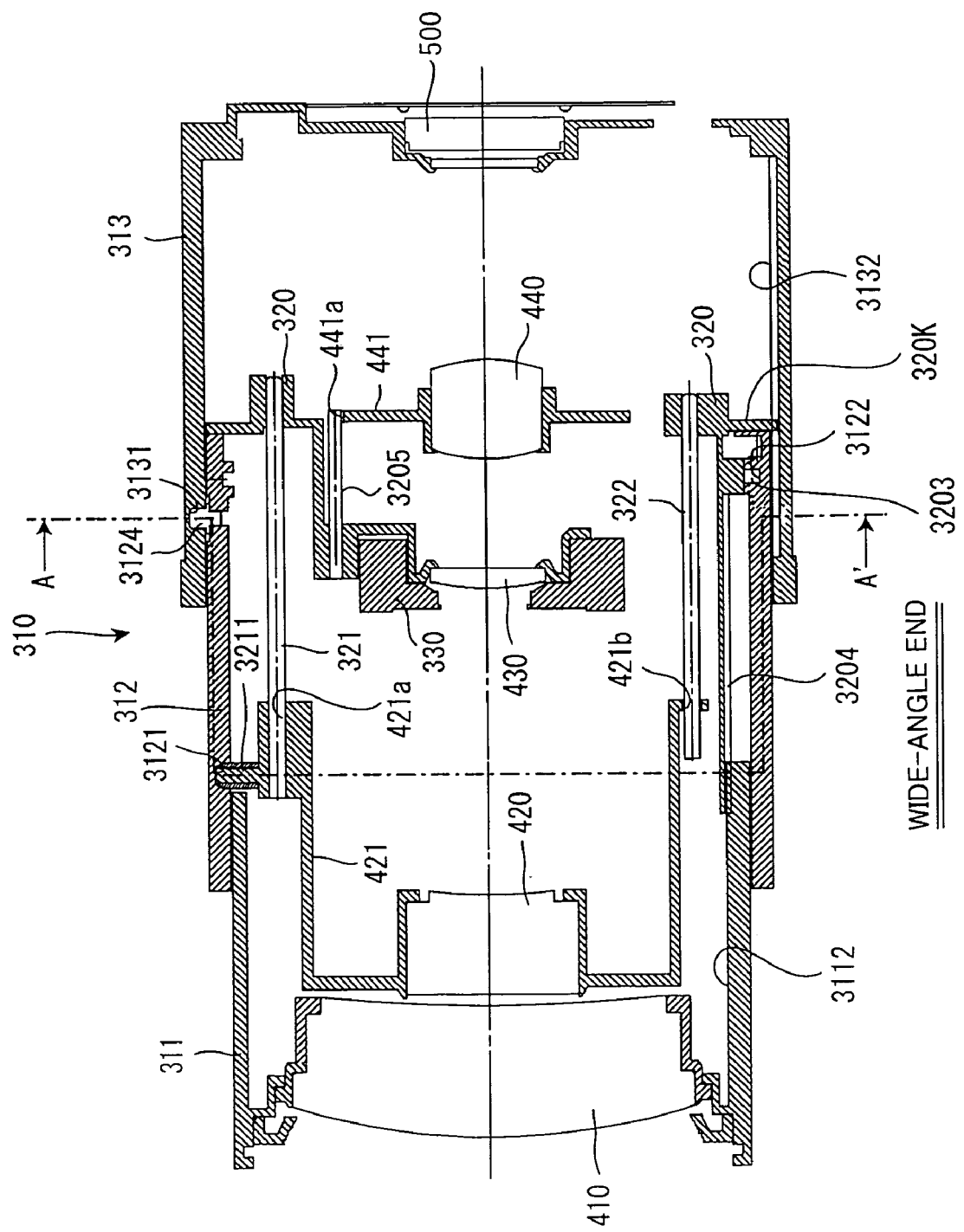
FIG. 7 is a sectional view taken along the optical axis of a lens barrel 310 incorporated into the digital camera shown in FIGS. 5 and 6 in a state in which the lens barrel is at the wide-angle end.
Figure 8:
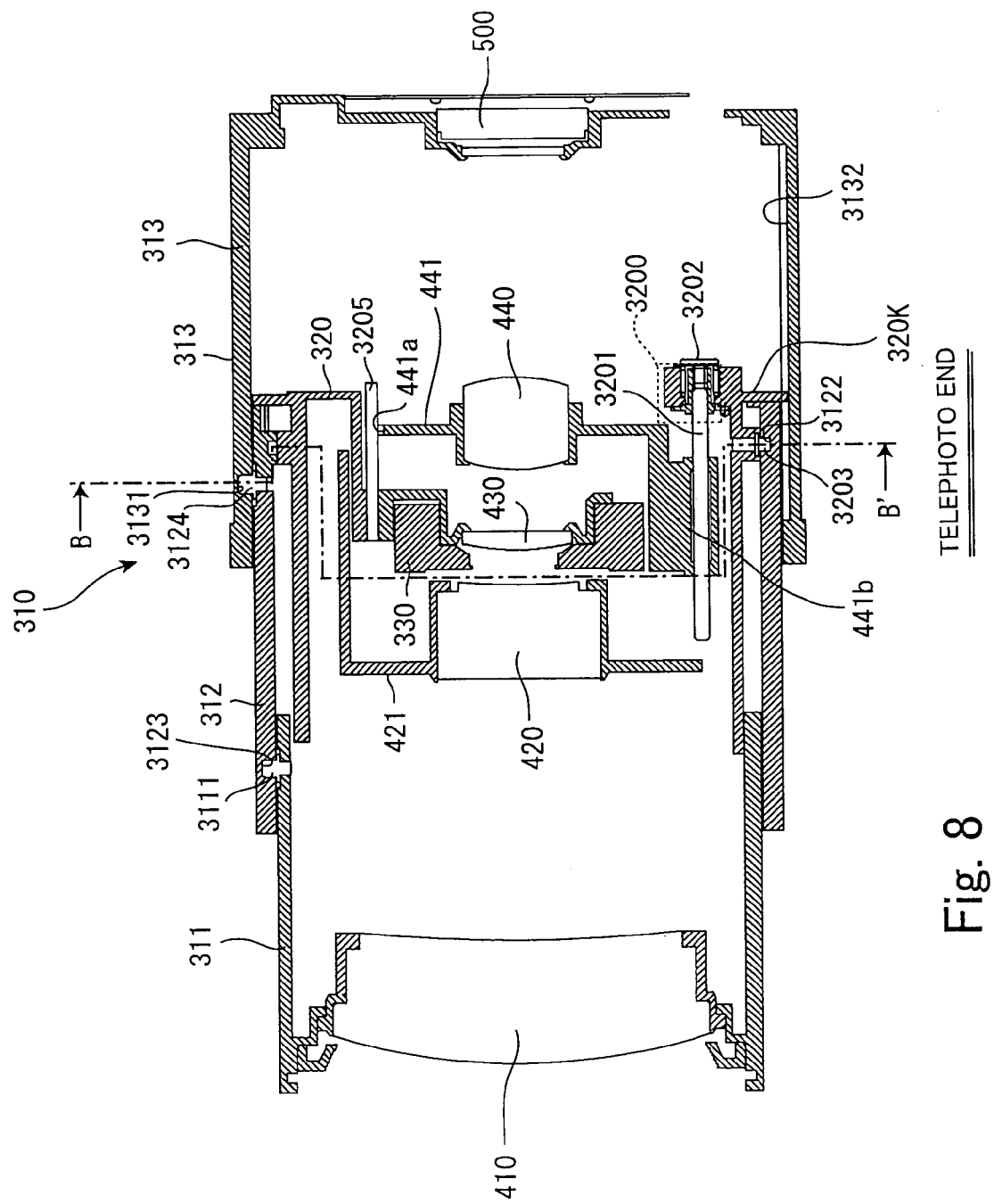
FIG. 8 is a sectional view taken along the optical axis of the lens barrel 310 incorporated into the digital camera shown in FIGS. 5 and 6 in a state in which the lens barrel is at the telephoto end.
Figure 9:
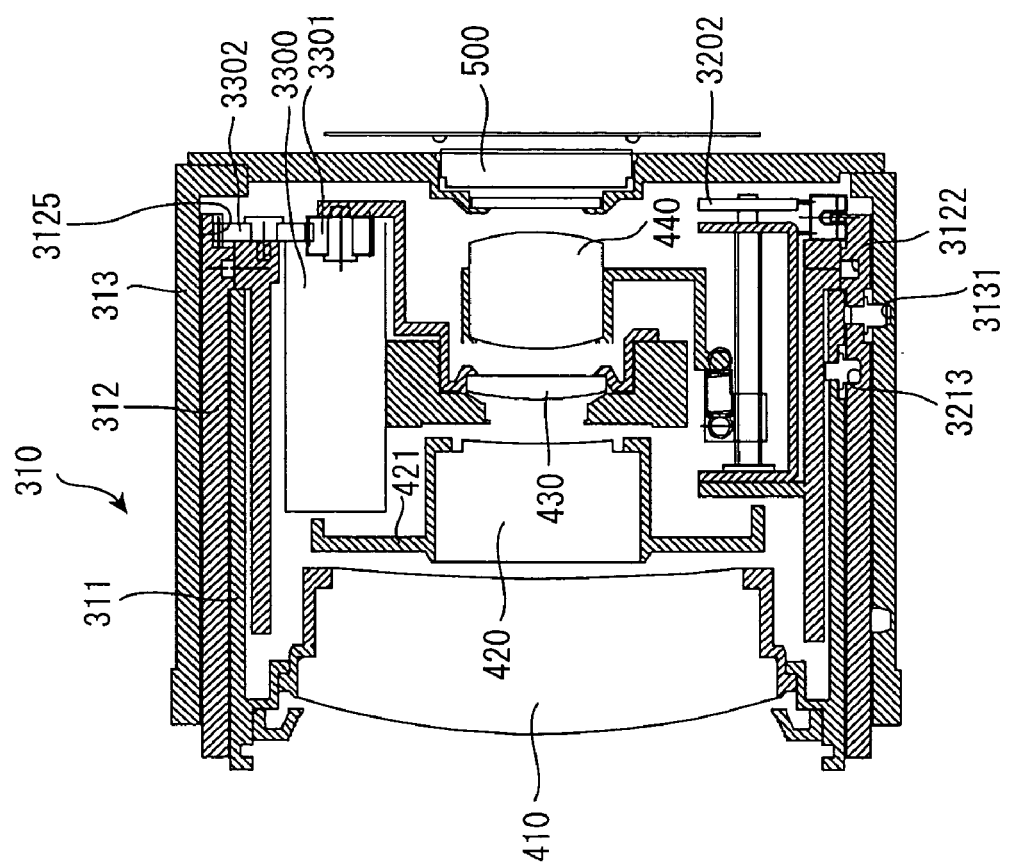
FIG. 9 is a sectional view taken along the optical axis of the lens barrel 310 incorporated into the digital camera shown in FIGS. 5 and 6 in a state in which the lens barrel is collapsed.
Figure 10:
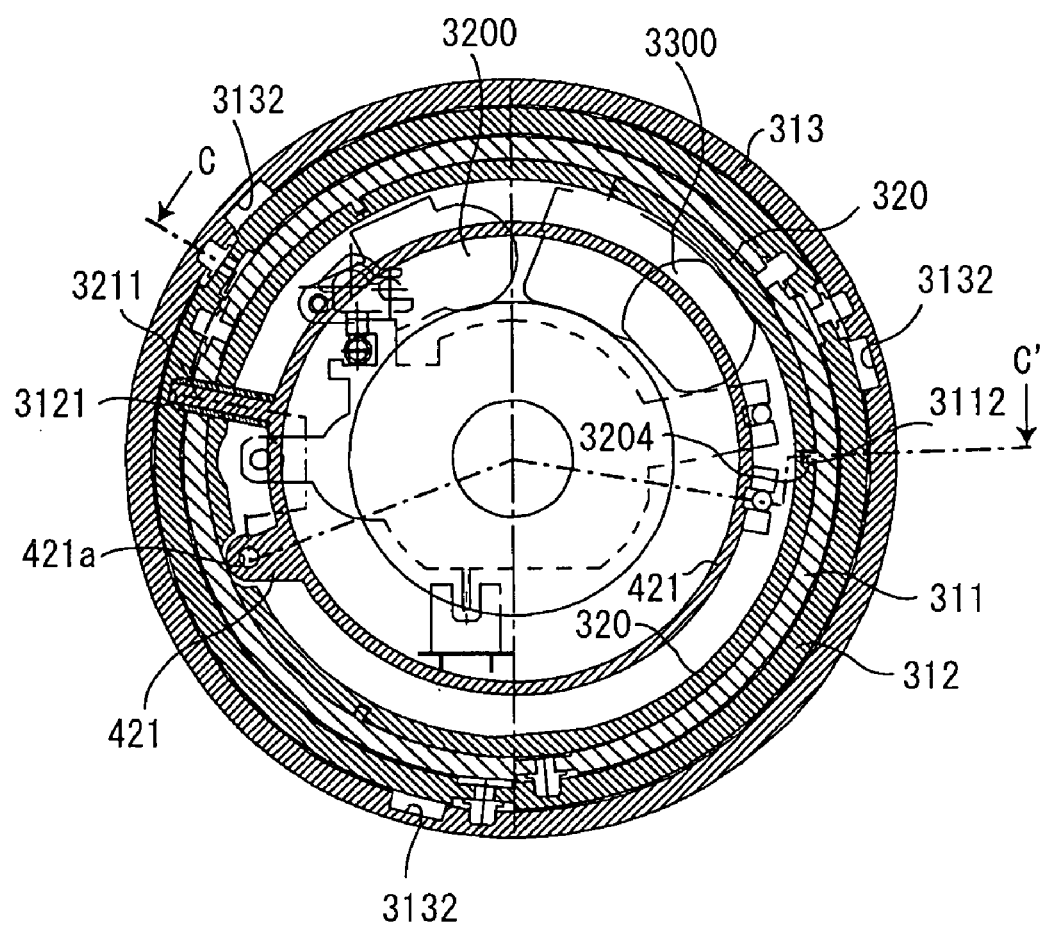
FIG. 10 shows the lens barrel sliced along the line and viewed in the direction of the arrows in FIG. 7.
Figure 11:
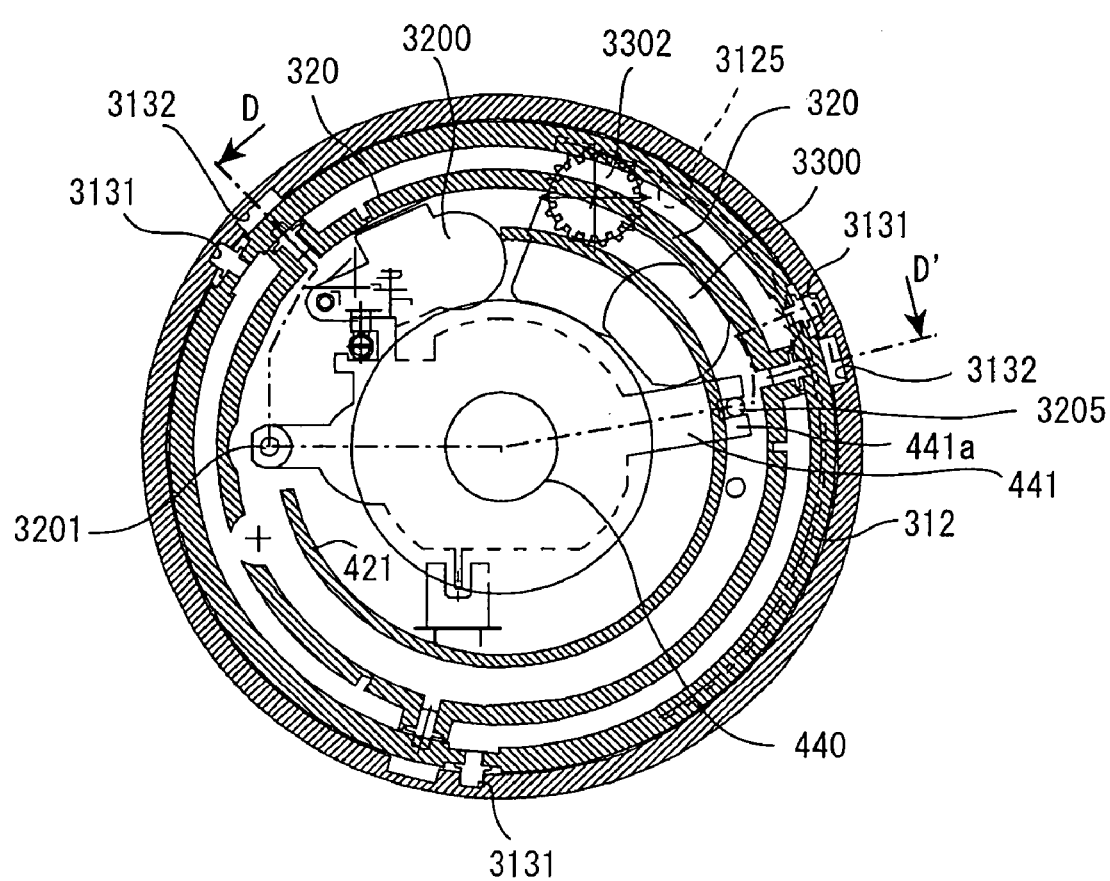
FIG. 11 shows the lens barrel sliced along the line and viewed in the direction of the arrows in FIG. 8.
Figure 12:
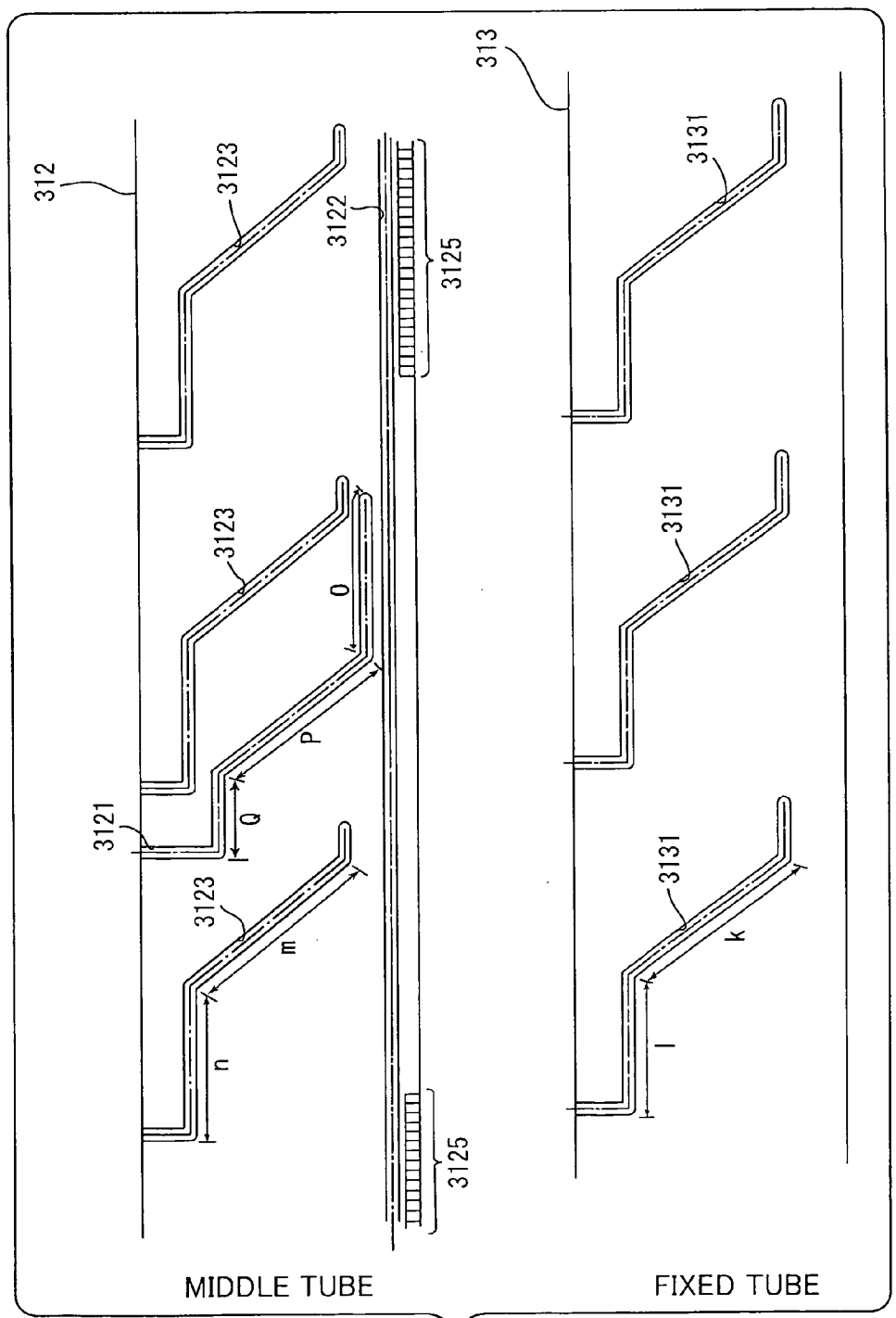
FIG. 12 is a developed view illustrating cam grooves formed in the inner wall of a middle tube.

FIGS. 7, 8 and 9 are sectional views taken along the optical axis of the lens barrel 310 incorporated into the digital camera shown in FIGS. 5 and 6. These FIGS. 7, 8 and 9 respectively show the wide-angle, telephoto end and collapsed state. FIG. 10 is a sectional view of the lens barrel in the state shown in FIG. 7, sliced and viewed in the direction of arrows A–A' in FIG. 7, and FIG. 11 is a sectional view of the lens barrel in the state shown in FIG. 8, sliced and viewed in the direction of arrows B–B' in FIG. 8. FIG. 7 is a sectional view along arrows C–C' shown in FIG. 10, and FIG. 8 is a sectional view along arrows D–D' shown in FIG. 11. Further, FIG. 12 is a developed view illustrating cam grooves formed in the inner walls of the outermost and middle tubes out of the three tubes constituting the lens barrel shown in FIG. 7 through FIG. 11. In the following description, the outermost tube of the three tubes is referred to as a fixed tube 313, the middle tube as a middle tube 312, and the innermost tube as a front tube 311.

A zoom lens of a four-group configuration consisting of a first lens group 410, second lens group 420, third lens group 430 and fourth lens group 440 is incorporated into this lens barrel 310. The fourth lens group 440 at the tail of this zoom lens of the four-group configuration is used as the focus lens.

As shown in FIGS. 7, 8 and 9, the first lens group 410 is held in the front tube 311, and this front tube 311 is equipped with cam pins 3111 (see FIG. 8). These campins 3111 are engaged with cam grooves 3123 (see FIGS. 8 and 12) formed in the inner wall of the middle tube 312. The middle tube 312 is also equipped with cam pins 3124, and those cam pins 3124 are engaged with cam grooves 3131 (see FIG. 12) formed in the inner wall of the fixed tube 313. A straight-ahead key ring 320 is so configured as to protrude toward the front tube 311, and its end on that protruding side engages with the front tube 311 to serve to stop the rotation of the front tube. Therefore, the front tube 311 and the straight-ahead key ring 320 are capable only of relative travel in the direction of the optical axis, but not of rotation around the optical axis.

The middle tube 312 here is so configured as to be rotated by a zoom motor 3300 (see FIG. 9). As the middle tube 312 rotates driven by the zoom motor 3300, the middle tube 312 moves, while rotating, in the direction of the optical axis along the shape of the cam grooves 3131 in the inner wall of the fixed tube 313. The front tube 311 moves in cam engagement with that rotating and moving middle tube 312 in the direction of the optical axis along the shape of the cam grooves 3123. FIGS. 9, 10 and 11 show how the zoom motor and the middle tube are coupled with each other. The figures show the configuration in which a turning force is transmitted to a gear 3125 disposed on the inner wall of the middle tube 312 from the zoom motor 3300 via a coupling gear 3302 and the middle tube 312 is thereby turned.

A straight-ahead key 320K disposed on the straight-ahead key ring 320 is engaged with a straight-ahead groove 3132 formed in the fixed tube 313 to be able to advance and retract. Engagement of cam pins 3203 disposed on this straight-ahead key ring 320 with cam grooves 3122 (see FIGS. 8 and 12) formed in the middle tube 312 and extending in the circumferential direction causes the middle tube 312 to rotatably engage with the straight-ahead key ring 320. Therefore, as this middle tube 312 is caused to advance or retract by its cam engagement with the fixed tube 313, the straight-ahead key ring 320 also advances or retracts together with the middle tube 312.

In this way, the middle tube 312 is capable of relative rotation around the optical axis, and of moving in the direction of the optical axis integrally with the straight-ahead key ring 320. The zoom motor 3300 is supported by that straight-ahead key ring 320. When the middle tube 312 is advancing or retracting in the direction of the optical axis together with that straight-ahead key ring 320, the rotation of the zoom motor 3300 supported by that advancing or retracting straight-ahead key ring 320 is transmitted to the middle tube 312 via a gear 3302, and the middle tube 312 is thereby driven to rotate. Then the gear linking section between the zoom motor 3300 and the middle tube is significantly shortened, resulting in a simple structure. Therefore, it is made possible to reduce the size of the zoom motor supported by the straight-ahead key ring, thereby allowing the lens barrel to be reduced in size by disposing that compact zoom motor within the lens barrel.

Regarding the lens groups holding frames holding the lens groups, the relationship among a lens group holding frame 421 holding the second lens group 420, a lens group holding frame 441 holding the fourth lens group 440 and the middle tube 312, the relationship between the straight-ahead key ring 320 and the third lens group 430, and the relationship between the middle tube 312 and the fixed tube 313 are now described in detail with reference to FIGS. 7 through 12.

First, the lens group holding frame 421 holding the second lens group 420 is equipped with cam pins 3211 on its outer wall. Those cam pins 3211 engage with cam grooves 3121 (see FIGS. 7 and 12) formed in the inner wall of the middle tube 312. Further as shown in FIGS. 7 through 11, the straight-ahead key ring 320 supports the second lens group 420 via two guide rods 321 and 322, supports the third lens group 430, and supports the fourth lens group 440 via a travel mechanism consisting of a column screw 3201 (see FIG. 8). The lens group holding frame 421 supporting the second lens group 420 is provided with two through-holes 421a and 421b, and the two guide rods 321 and 322 supported by the straight-ahead key ring 320 penetrate those through-holes 421a and 421b. The cam pins 3211 of the lens group holding frame 421 are positioned in the vicinity of the through-hole 421a out of those through-holes, and those cam pins 3211 engage with the cam grooves 3121 of the middle tube 312. As these cam pins 3211 travel along the shape of the cam grooves 3121, the second lens group 420, guided by the two guide rods 321 and 322, moves from the telephoto end to the wide-angle end or from the wide-angle end to the telephoto end.

The middle tube 312 is equipped with the cam pins 3124 implanted on its outer wall, and those cam pins 3124 engage with the cam grooves 3131 formed in the inner wall of the fixed tube 313. These cam grooves 3131 so extend as to rotate by a prescribed angle (the area marked with symbol k in FIG. 12) during extension from the collapsed state shown in FIG. 9 to the telephoto end shown in FIG. 8. Therefore the middle tube 312, receiving the driving force from the zoom motor 3300 (see FIG. 9), is extended in the direction of the optical axis while rotating by a prescribed angle following those cam grooves 3131 during its travel from the collapsed state (FIG. 9) to the telephoto end (FIG. 8), and along with that extension of the middle tube 312 the front tube 311 is extended along the shape of the cam grooves 3123 (the area marked with symbol m in FIG. 12) without rotating. If the zoom switch is operated toward the wide-angle side when the middle tube 312 is in this extended state, the middle tube 312 rotates in that position (the area marked with symbol l in FIG. 12), and the rotation causes the second lens group 420 to move to the wide-angle end along the shape of the cam grooves 3121 (the area marked with symbol p in FIG. 12). In this way, zooming is accomplished according to the operation of the zoom switch.

The third lens group 430 is supported by the straight-ahead key ring 320, and that straight-ahead key ring 320 also supports the fourth lens group 440 via a travel mechanism consisting of a focus motor 3200 (see FIG. 8) and the column screw 3201 meshed with the gear train 3202 of that focus motor 3200. This fourth lens group 440 is held by the lens group holding frame 441, and the lens group holding frame 441 is equipped with a fork 441a, and a guide rod 3205 disposed on the straight-ahead key ring 320 engages with that fork 441a. A nut 441b into which the column screw 3201 is to be screwed is fixed to the lens group holding frame 441, and the column screw 3201 supported by the straight-ahead key ring 320 is screwed into that nut 441b.

On the other hand, the focus motor 3200 for moving the fourth lens groups in the direction of the optical axis is also supported by the straight-ahead key ring 320, and the rotational driving force of the focus motor 3200 supported by the straight-ahead key ring 320 is transmitted to the column screw 3201 shown in FIG. 8 via a gear train 3202 to rotate this column screw 3201. Along with this rotation, the lens group holding frame 421, guided by the column screw 3201 and the guide rod 3205, travels in the direction of the optical axis correspondingly to the extent of rotation of the column screw 3201, and focusing is thereby performed. This focusing is performed in accordance with a driving instruction issued to the focus motor 3200 on the basis of image data generated by an image pickup device 500.

If the shutter button 304 is pressed after focusing is accomplished in this way, a shutter unit 330 supported by the straight-ahead key ring is driven, and an electronic shutter release is driven to take an image. As a result, light from the subject having passed the first lens group 410, second lens group 420, third lens group 430 and fourth lens group (focus lens) 440 forms an image on the light-receiving surface of the image pickup device 500, and an image signal representing that subject image formed on that light-receiving surface is generated by the image pickup device 500. Incidentally, wiring cables for transmitting instructions to the focus motor or the shutter unit are not shown in FIGS. 7 through 11.

By causing in this way the straight-ahead key ring 320 traveling in direction of the optical axis to support the second lens group 420 and the third lens group 430 and, via the column screw 3201, the fourth lens group 440, and further the focus motor 3200 rotating that column screw 3201 and the zoom motor 3300 rotationally driving the middle tube 312, the optical axes can be kept accurate to match the linearity of the straight-ahead key ring.

Figure 1:
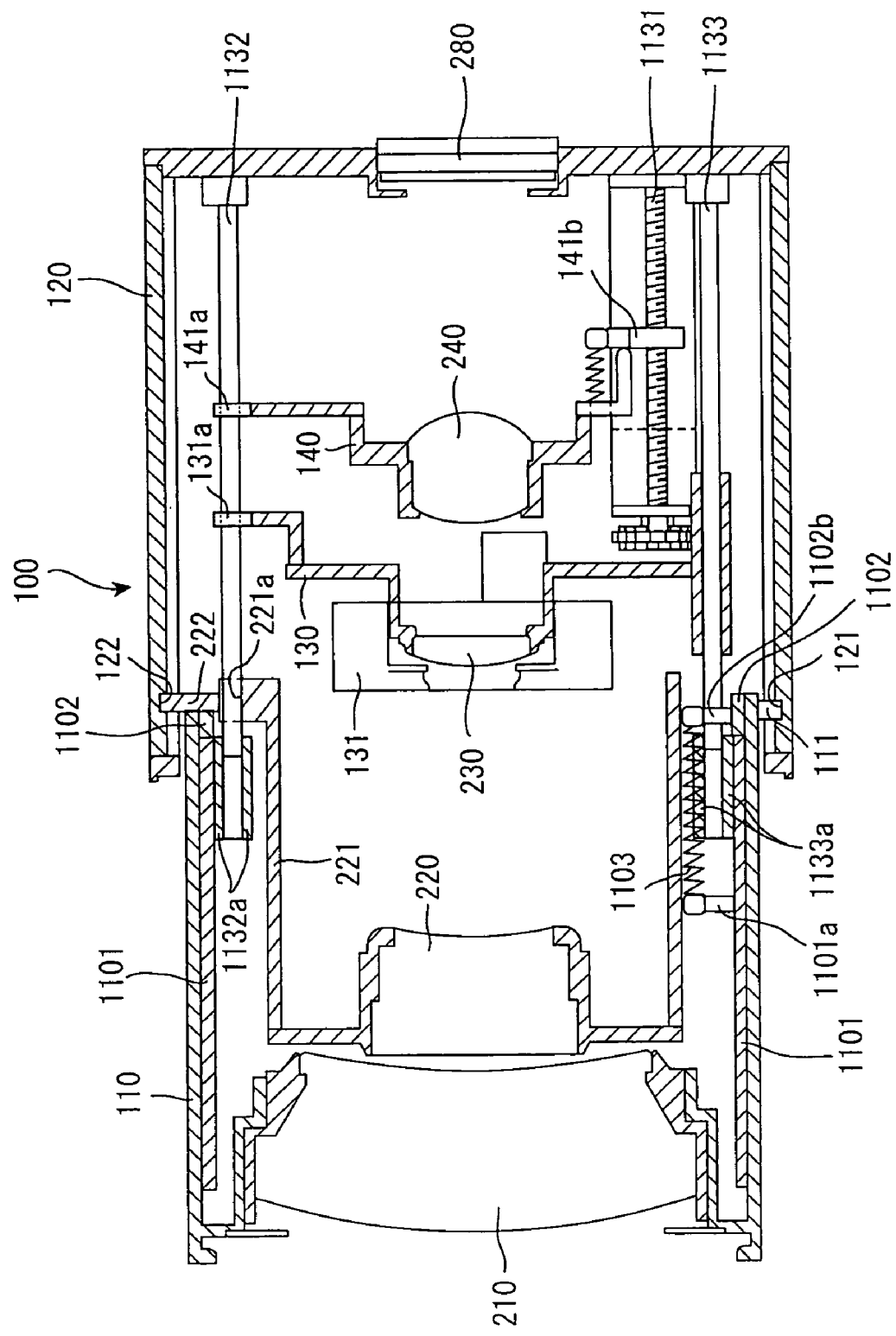
FIG. 1 is a sectional view taken along the optical axis of a lens barrel built into a conventional digital camera in a state in which the lens barrel is at a wide-angle end.
Figure 2:
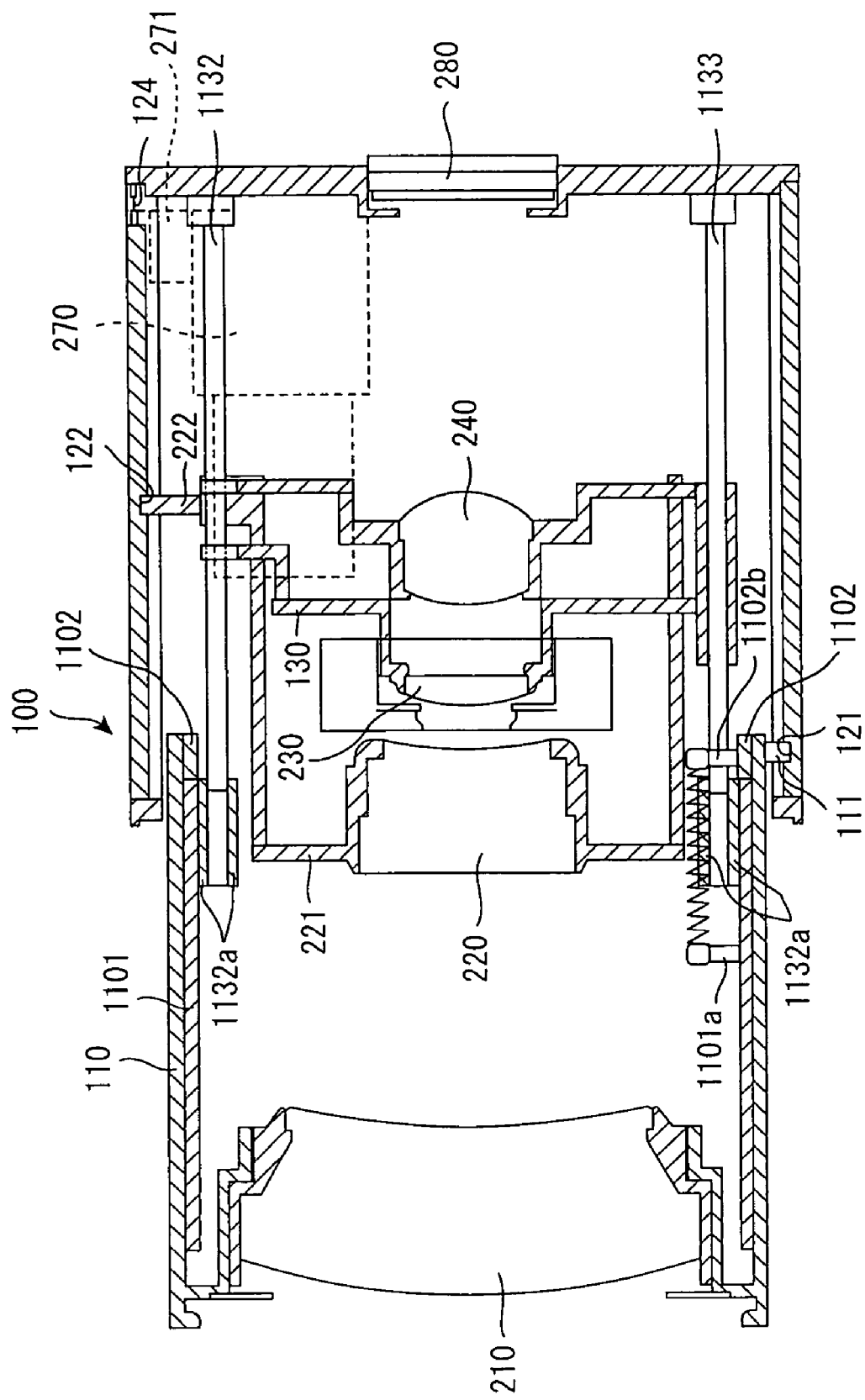
FIG. 2 is a sectional view taken along the optical axis of the lens barrel built into the conventional digital camera in a state in which the lens barrel is at a telephoto end.
Figure 3:
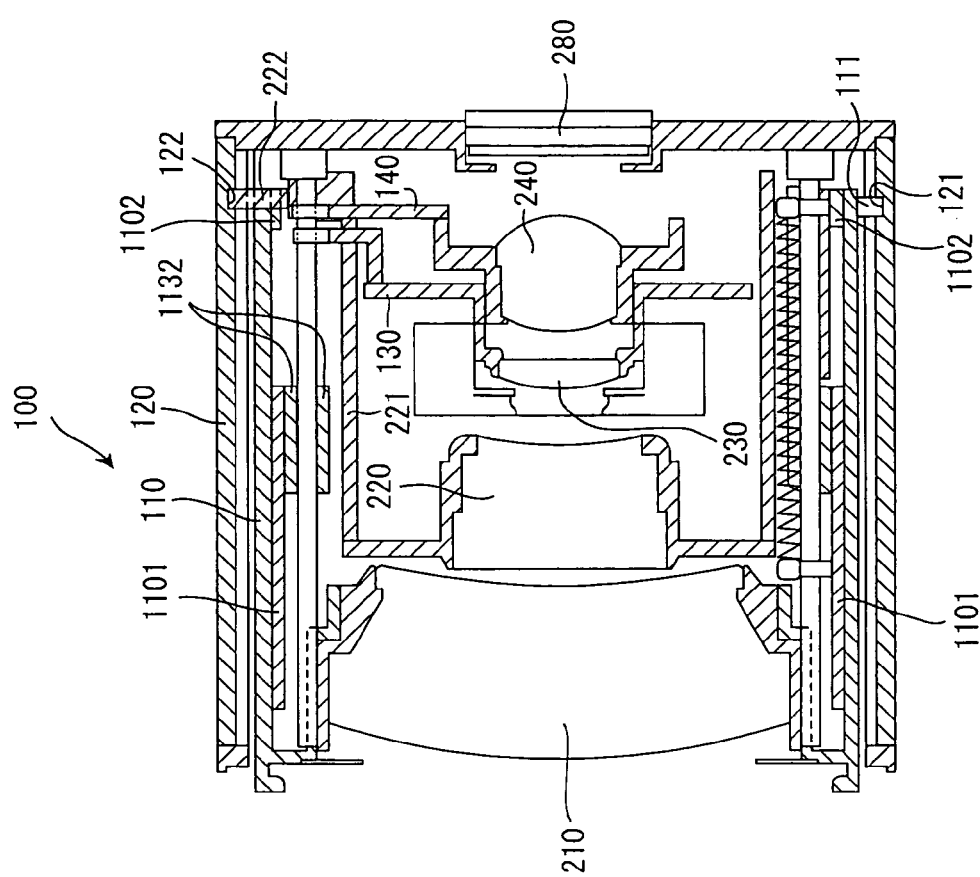
FIG. 3 is a sectional view taken along the optical axis of the lens barrel built into the conventional digital camera in a state in which the lens barrel is collapsed.
Figure 4:
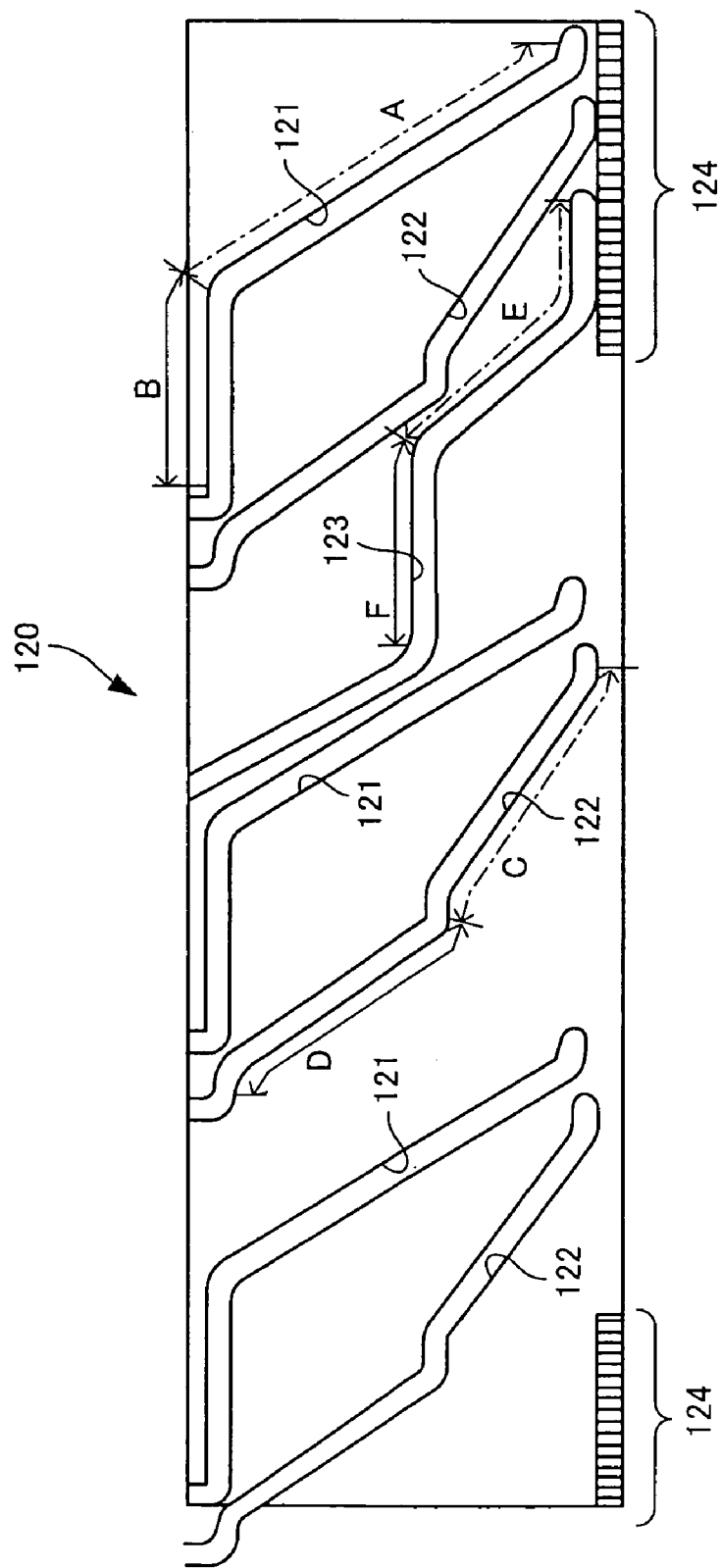
FIG. 4 is a developed view illustrating cam grooves formed in the inner wall of an outer tube 120 and used for adjusting the focal distance by extending an inner tube 110 as well as controlling the distance between a second lens group 220 and a third lens group 230.

In this way, there is no need for guide rods, long extending as shown in FIG. 1, provided to correct any misalignment of the optical axes of the second lens group 420, third lens group 430 and fourth lens group 440, and a free space is left between the image pickup device 500 and the fourth lens group 440. As all the lenses can be stowed into that free space when the lens barrel is collapsed, the lens barrel can be reduced in length. Also, the first cam grooves 3122 shown in FIG. 12 are disposed in the circumferential direction of the middle tube 312 to rotatably engage the straight-ahead key ring with the middle tube 312, the straight-ahead key ring 320 is also moved along with the travel of the middle tube 312, and at the same time the front tube 311 is extended along the second cam grooves 3123 as much as the length of the middle tube 312. The lens barrel is thereby extended in length, namely increased in zoom ratio. Furthermore, when the lens barrel is collapsed, its length can be reduced to no greater than the length of the middle tube 312, making it possible to reduce the profile thickness of the body.

Therefore, the body of the digital camera 300 shown in FIGS. 5 and 6 is thin in profile thickness because the lens barrel 310 can be accommodated within the camera body when it is collapsed. When an image is to be taken, the lens barrel 310 holding the zoom lens of a four-group configuration is extended to a great extent out of the camera body to enable the user to enjoy image taking at a high zoom ratio with this digital camera 300. Finally, the internal configuration of the digital camera shown in FIGS. 5 and 6 is briefly described.

Figure 13:
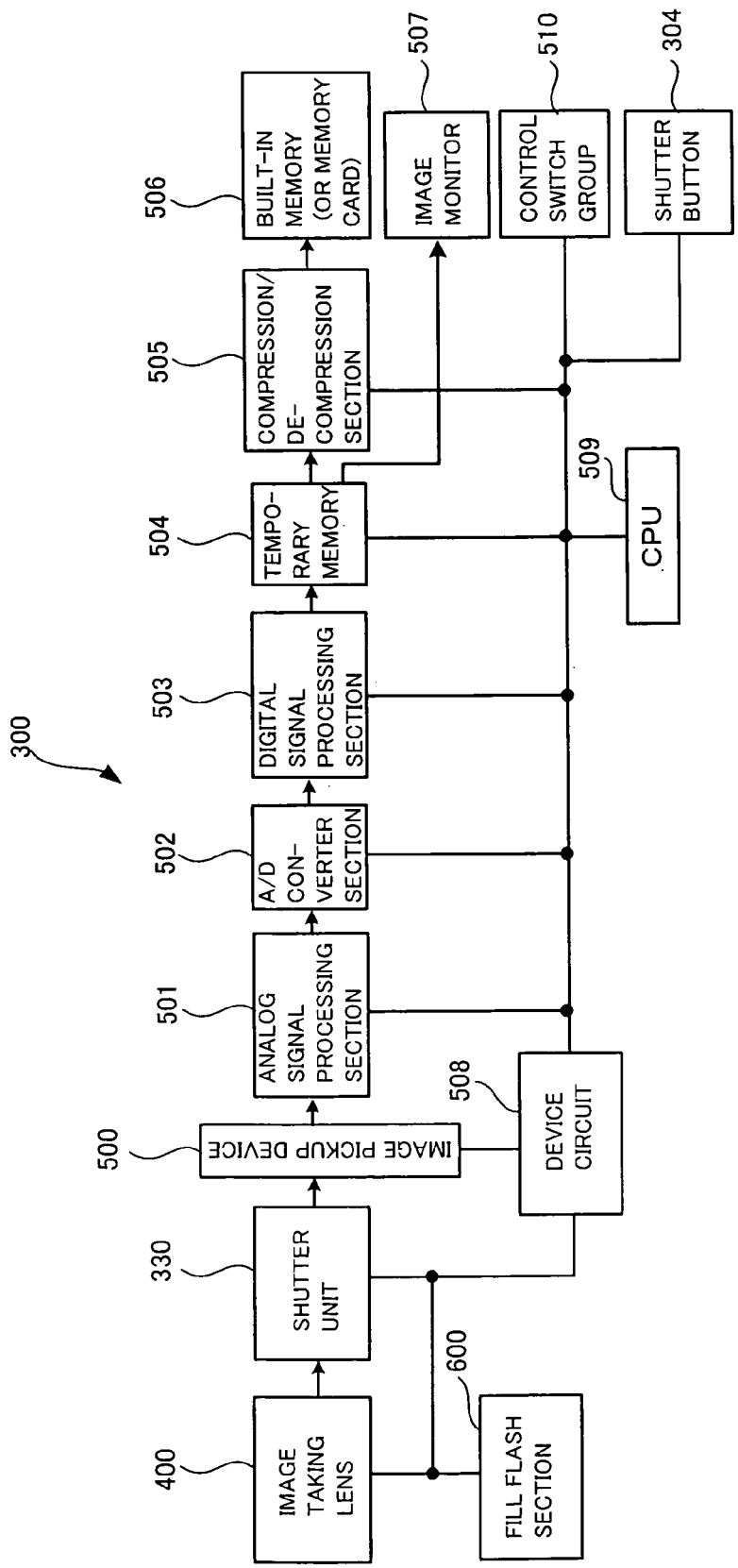
FIG. 13 is a block diagram showing the circuit configuration of the digital camera of this embodiment.

FIG. 13 is a block diagram shown the circuit configuration of the digital camera of this embodiment.

This digital camera 300 is equipped with a zoom lens 400 of a four-group configuration consisting of the first lens group 410, second lens group 420, third lens group 430 and fourth lens group 440, the shutter unit 330 and the image pickup device 500, all shown in FIGS. 7 through 9. A subject image formed on the image pickup device 500 via the zoom lens 400 and shutter unit 330 is converted into an analog image signal by the image pickup device 500. The shutter unit 330 here is configured of an aperture for limiting the quantity of light irradiating the image pickup device and a shutter which prevents smearing caused by light when the analog image signal is read out of the image pickup device 500.

Here is also provided a fill flash section 600. This fill flash section 600, through a fill flash window shown in FIGS. 5 and 6, emits supplementary light ahead of the digital camera in low-light conditions. The fill flash section 600 can also be caused to emit as required if not in low-light conditions.

This digital camera 300 is further equipped with an analog signal processing section 501, A/D converter section 502, digital signal processing section 503, temporary memory 504, compression/decompression section 505, built-in memory (or memory card) 506, image monitor 507 and drive circuit 508. The solid image pickup device 500 is driven at timings generated by a timing generation circuit (not shown) in the drive circuit 508, and outputs an analog image signal. The drive circuit 508 also includes drive circuits which drive an image taking lens 400, shutter unit, fill flash section 600 and so forth. The analog image signal outputted from the image pickup device 500 undergoes analog signal processing by the analog signal processing section 501, A/D conversion by the A/D converter section 502, and digital signal processing by the digital signal processing section 503. Image data representing the image after the digital signal processing are temporarily stored into the temporary memory 504. The image data stored into the temporary memory 504 are compressed by the compression/decompression section 505 and recorded into the built-in memory (or memory card) 506. Depending on the image pickup mode, the compression process can be dispensed with and the data can be directly recorded into the built-in memory (or memory card) 506. The image data stored into the temporary memory 504 are read out to the image monitor 507 to display the image of the subject on the image monitor 507.

This digital camera 300 is further equipped with a CPU 509 for exercising overall control over this digital camera 300, control switch group 510 including a zoom control switch, and the shutter button 304. By setting the camera to a desired image taking conditions including the setting of a desired angle of view by operating the control switch group 510 and pressing down the shutter button 304, a photograph is taken, i.e. the image data described above are generated.

What is claimed is:

1. A lens barrel which holds a zoom lens consisting of a plurality of lens groups, the lens barrel comprising:
    a fixed tube, a straight-ahead key member which is engaged with the fixed tube to be able to advance or retract, a middle tube which is rotatably engaged with the straight-ahead key member and is caused by cam engagement with the fixed tube to advance or retract along with the rotation; and
    a front tube which is engaged with the straight-ahead key member to be able to advance or retract and is caused by cam engagement with the middle tube to advance or retract along with the rotation of the middle tube, wherein
    the zoom lens is configured of a plurality of lens groups consisting of a first lens group which is fixed to the front tube, a second lens group, a third lens group and a fourth lens group which are fixed to the straight-ahead key member or supported by the straight-ahead key member to be able to advance or retract.

2. The lens barrel according to claim 1, wherein
    the second lens group is supported by the straight-ahead key member to be able to advance or retract and is caused by cam engagement with the middle tube to advance or retract along with the rotation of the middle tube.

3. The lens barrel according to claim 1, wherein the third lens group is fixed to the straight-ahead key member.

4. The lens barrel according to claim 1, wherein the fourth lens group is the focus lens, which is supported by the straight-ahead key member via a travel mechanism for focusing.

5. The lens barrel according to claim 4, wherein the travel mechanism is equipped with a focus motor which provides a driving force to move the focus lens, and the focus motor is supported by the straight-ahead key member.

6. The lens barrel according to claim 1, wherein a zoom motor is provided to vary the zoom ratio of the zoom lens by rotationally driving the middle tube, and the zoom motor is supported by the straight-ahead key member.

7. The lens barrel according to claim 6, wherein the middle tube has in part of its inner wall a row of gear teeth disposed in the circumferential direction, and the zoom motor rotationally drives the middle tube via a gear which links the rotation shaft of the zoom motor and the row of gear teeth.

8. The lens barrel according to claim 1, wherein the middle tube has cam pins which protrude from its outer wall surface and are intended for cam engagement with the fixed tube, first cam grooves which rotatably engage with the straight-ahead key member and second cam grooves for cam engagement with the front tube, both formed in its inner wall.

9. The lens barrel according to claim 8, wherein the first cam grooves extend in the circumferential direction.

10. An image taking apparatus equipped with a lens barrel which holds a zoom lens consisting of a plurality of lens groups and takes a photograph by catching light incident from the subject via the zoom lens held by the lens barrel, wherein
    the lens barrel comprises a fixed tube, a straight-ahead key member which is engaged with the fixed tube to be able to advance or retract, a middle tube which is rotatably engaged with the straight-ahead key member and is caused by cam engagement with the fixed tube to advance or retract along with the rotation, and a front tube which is engaged with the straight-ahead key member to be able to advance or retract and is caused by cam engagement with the middle tube to advance or retract along with the rotation of the middle tube;
    the zoom lens being configured of a plurality of lens groups consisting of a first lens group which is fixed to the front tube, a second lens group, a third lens group and a fourth lens group which are fixed to the straight-ahead key member or supported by the straight-ahead key member to be able to advance or retract.

11. The image taking apparatus according to claim 10, wherein the lens barrel is equipped with a focus motor which provides a driving force to a travel mechanism to move the focus lens, and the focus motor is supported by the straight-ahead key member.

12. The image taking apparatus according to claim 10, wherein the lens barrel is further provided with a zoom motor which varies the zoom ratio of the zoom lens by rotationally driving the middle tube, and the zoom motor is supported by the straight-ahead key member.

13. The image taking apparatus according to claim 10, wherein the middle tube has cam pins which protrude from its outer wall surface and are intended for cam engagement with the fixed tube, first cam grooves which rotatably engage with the straight-ahead key member and second cam grooves for cam engagement with the front tube, both formed in its inner wall.

14. The image taking apparatus according to claim 10, further provided with an image pickup device which generates an image signal by catching light incident from the subject via the zoom lens held by the lens barrel.

* * * * *